Patented May 14, 1929.

1,713,236

UNITED STATES PATENT OFFICE.

THOMAS MIDGLEY, JR., CARROLL A. HOCHWALT, AND CHARLES ALLEN THOMAS, OF DAYTON, OHIO, ASSIGNORS TO GENERAL MOTORS CORPORATION, OF DETROIT, MICHIGAN, A CORPORATION OF DELAWARE.

POLYMERIZATION OF DIENES.

No Drawing.   Application filed August 25, 1926. Serial No. 131,548.

The invention relates to the polymerization of bodies of the conjugated diene type, either of the open or closed chain varieties, isoprene being referred to herein as a specific example. It is well known that bodies of this type may be polymerized to produce various rubber-like or gummy bodies having more or less the chemical and physical properties of natural rubbers and that the polymerization may be promoted by the action of various substances having a catalytic effect. The object of the invention is to provide means for facilitating and controlling the reactions whereby such polymerization is brought about.

One phase of the invention involves the use as a catalytic body of a catalytic metal or metals of such constitution as to remain liquid at the temperature at which the polymerization is effected. Taking isoprene, for example, as the substance to be treated, since its boiling point is about 33° C., at normal pressure, it is necessary, in accordance with the purpose of our invention, to provide a metal which shall remain liquid at, and preferably for some distance below, the boiling point given, or, if pressures other than atmospheric, or substances having other physical properties, are utilized, a metal which shall remain liquid under the working conditions in the particular case. The metal is preferably brought into finely divided condition, as by agitation previous to or continued during the progress of the reaction, so as to reduce it to a condition of subdivision into relatively minute globules. By this means the contact surface of the metal is enormously increased and the reaction is correspondingly hastened.

As an example of a catalyst of this type we may use an alloy of alkali metals, such as sodium and potassium, having a relatively low melting point, a eutectic mixture of these two metals melting at about −12° C. Since both of these metals appear to have a catalytic effect in promoting the polymerization of dienes the activity of the alloy is not lessened by the admixture of the two, and, in fact, whether by reason of chemical or physical effects due to the combination, the alloy is found to bring about a very uniform as well as very rapid polymerization of the diene as compared with sodium alone, which has hitherto been used for this purpose.

It is preferred to use dienes in relatively pure conditions, particularly so far as concerns the presence of impurities containing sulphur or nitrogen, as these appear to retard or inhibit to some extent the action of the catalyst. Ammonia, for example, has a marked effect in retarding the reaction. The reaction appears to be promoted to some extent also by the presence of a small quantity of solvent for the reaction product, such as benzol, as this seems to facilitate the maintenance of a clean contact surface on the metal. The reaction should be carried out, of course, in an atmosphere of material inert to the alloy, such, for example, as nitrogen.

We have also found that the polymerization of dienes may be effected in stages by suitable selection of conditions or catalysts. If, for example, we treat isoprene with the metal catalyst already described, we obtain, in a period even as short as an hour or two, a conversion into a white plastic gummy body having fairly well-defined properties. This body may then be separated from the reaction mixture and dissolved in a suitable solvent, as benzol, and subjected to further polymerization in the presence of other catalysts, such as sulphuric acid or one of the chloride catalysts, such as chlorides of aluminum, tin, zinc, iron, etc., which causes further conversion into a body resembling more closely in properties the rubber-like bodies obtainable from vegetable sources.

It will be understood that the polymerization of the dienes in stages as by succesive action of catalysts, each promoting or effecting a reaction or polymerization of the product of the preceding stage, enables a much more accurate control to be maintained of the direction of the reactions and the selection of the character of the products than would otherwise be possible. The intermediate products may, of course, be separated or purified or subjected to other treatment between the successive steps of polymerization. Suitable temperature and pressure and other conditions appropriate to the reaction which it is desired to promote in each stage may also be selected independently of those prevailing in any other stages. The order of succession of the predetermined conditions, as well as of the catalysts to be employed, is also subject to selection. While we have above referred to the treatment first with the liquid alloy, such catalyst may be employed in a succeeding stage or may be replaced by other catalysts, depending upon the specific character of product desired. The essential feature is the subjection of the product of one polymerization to a second which is wholly independent of the first.

We claim:

1. The process of polymerizing dienes which comprises subjecting them to the action of a metal catalyst comprising an alloy of alkali metals which is liquid under the working conditions under which the polymerization is effected.

2. The process as set forth in claim 1, the catalyst comprising an alloy of sodium and potassium.

3. The process of polymerizing dienes which comprises subjecting them to the action of a liquid alloy of alkali metals, and subjecting the product of this reaction to further polymerization in the presence of a metallic chloride.

4. The process of polymerizing dienes which comprises subjecting them to the action of a catalyst comprising an alloy of sodium and potassium and maintaining the reaction material at a temperature above the melting point of the alloy.

5. The process as set forth in claim 4, the alloy being a eutectic alloy.

In testimony whereof we affix our signatures.

THOMAS MIDGLEY, Jr.
CARROLL A. HOCHWALT.
CHAS. ALLEN THOMAS.